United States Patent [19]

Veilex

[11] 3,953,810
[45] Apr. 27, 1976

[54] DEVICE FOR MODULATING A BEAM OF RADIATION

[75] Inventor: Robert Veilex, Paris, France

[73] Assignee: U.S. Philips Corporation, New York, N.Y.

[22] Filed: May 9, 1974

[21] Appl. No.: 468,277

Related U.S. Application Data

[63] Continuation of Ser. No. 279,972, Aug. 11, 1972, abandoned, which is a continuation of Ser. No. 48,834, June 10, 1970, abandoned, which is a continuation of Ser. No. 617,544, Feb. 21, 1976, abandoned.

[30] Foreign Application Priority Data

Feb. 25, 1966 France .......................... 66.51123

[52] U.S. Cl. ............................ 332/7.51; 331/107 G; 331/107 R
[51] Int. Cl.² ......................................... H01S 3/10
[58] Field of Search .......... 332/7.51; 350/160, 161, 350/150, 151; 331/94.5 M, 107 G

[56] References Cited
UNITED STATES PATENTS

| | | |
|---|---|---|
| 3,259,016 | 7/1966 | Rosenblum .................... 332/7.51 |
| 3,295,911 | 1/1967 | Ashkin et al. ................... 350/160 |
| 3,365,581 | 1/1968 | Tell et al. ....................... 350/150 |
| 3,436,545 | 4/1969 | Richards et al. ................ 350/150 |
| 3,440,425 | 4/1969 | Nutson et al. ................ 331/107 G |

Primary Examiner—Richard A. Farley
Assistant Examiner—N. Moskowitz
Attorney, Agent, or Firm—Frank R. Trifari; Henry I. Steckler

[57] ABSTRACT

A modulator for monochromatic beam of radiation, such as a laser beam, consists of a semiconductor crystal body. A sufficient potential is applied to the body to produce a moving zone of resistivity and potential gradient varying from the remainder of the body. The zone may result, for example, from the Gunn effect or the piezoelectric effect. The zone also has optical properties differing from the remainder of the body, so that a beam directed at the crystal can be modulated by the moving zone.

13 Claims, 3 Drawing Figures

INVENTOR.
ROBERT VEILEX

DEVICE FOR MODULATING A BEAM OF RADIATION

CROSS REFERENCES

This is a continuation of application Ser. No. 279,972, filed Aug. 11, 1972 which in turn is a continuation of application Ser. No. 48,834, filed June 10, 1970, which in turn is a continuation of application Ser. No. 617,544, filed Feb. 21, 1967, all which have been abandoned.

It is known that so-called "lasers" are capable of emitting monochromatic beams of radiation, which may be coherent, that is to say be formed by electromagnetic waves of the same very high frequency and of the same phase. The radiation emitted by such devices may lie in the visible part of the spectrum or in the infrared or the ultraviolet region. The term laser not only refers to devices operating as light amplifiers by stimulated radiation emission but also to sources of monochromatic radiation, for example, some electroluminescent semiconductor diodes of gallium arsenide, in which stimulated emission of radiation without light amplification is obtained.

Owing to the very low noise level of these lasers they are frequently used in far-reaching radio communications. In order to establish such communications it is advantageous to have a possibility of modulating the beams emitted by such lasers.

For this purpose devices are known which are capable of modulating the intensity of a beam of radiation by means of an electric signal, the operation being based on given properties of semiconductor bodies, particularly on the variations of the reflection of the radiation on the surface of a semiconductor body or on the variations of the transmission properties, when such a beam passes through a semiconductor body in its direction of length, said body being provided with transparent electrodes, when a strong electric field between said electrodes is produced.

It is known that the optical absorption coefficient of a thin semiconductor wafer varies to a high extent with the wavelength of the passing radiation. The curve of the absorption coefficient of the material as a function of the energy of the incident photons exhibits an abrupt absorption variation, when the energy of said photons becomes equal to the width of the energy gap between the valance band and the conduction band in the semiconductor concerned. With a radiation of a wavelength exceeding that corresponding to said abrupt absorption variation and hence with a lower energy of the photons the (restricted) absorption is to be attributed to the fairly small number of free charge carriers and electron transitions between said valence band and conduction band on the one hand and the additional levels due to impurities or deficiencies of the crystal on the other hand. If with a smaller wavelength the photon energy is equal to or higher than the energy difference between the upper boundary of the valence band the lower boundary of the conduction band, the interaction of these photons with the electrons of the valence band produces direct transitions of the excited electrons from the valence band to the conduction band, which is attended with a high absorption of the exciting radiation. The place of the level where this high absorption with lower wavelength appears is related to the width of the energy gap of the semiconductor body, which relationship is expressed by $\lambda s = 1.237/\delta$, wherein $\lambda s$ is the threshold wavelength in microns and $\delta$ the width of the energy gap in eV.

It has furthermore been found (Franz-Keldyah effect) that is is possible to displace this absorption threshold by applying a strong electric field across the semiconductor; the effect of this field is equivalent to a small reduction of the width of the energy gap. This results in a rise of the threshold wavelength $\lambda s$ at which strong absorption occurs and hence a stronger absorption of the radiation which would lie directly below the absorption threshold in the absence of the electric field. By applying a strong variable electric field across the semiconductor wafer, the threshold $\lambda s$ may be varied in known manner and hence the beam passing through the wafer can be modulated.

Several research-workers have been occupied in mathematically analysing the relevant mechanisms, inter alia J. Callaway in his article in "Physical Review" of May 18, 1964, page A998. The formulae and calculations resulting from this analysis are long and complicated but an impression of the importance of the Franz-Keldysh effect is obtained from the conclusions of the calculations of J. Callaway with respect to a GaAs crystal; with monochromatic radiation, the photons of which have an energy which is 0.02 eV lower than the absorption threshold in the absence of a field, which threshold corresponds to the width of the energy gap (about 1.35 eV), the application of a field of $10^5$ V/cm results in a reduction of the transmission of about 87%.

It is furthermore known that the application of a strong electric field to a great number of insulating or semiconductor bodies produces the phenomenon of an electric double refraction, which becomes manifest in a rotation of the polarisation plane of the linearly polarised beam of radiation passing through the body, which rotation may be utilised for obtaining a modulation of the beam emerging from the body.

There are furthermore known circumstances in which the over-all voltage applied to the terminals of a body of homogeneous semiconductor material of constant cross section is not distributed uniformly along said body due to various mechanisms. With certain semiconductor materials, upon the application of electric fields of increasing intensity, deviations from the apparent conductivity of the material occur, becoming manifest, for example, in the current-voltage curve of the body, which curve exhibits a portion in which the differential resistance of the body becomes negative. Owing to this negative differential resistance it is not always possible to measure and/or to render visible the shape of the curve with the negative slope; in particular current oscillations of very high frequency may occur. One of these phenomena of unstability becoming manifest in current oscillations is known under the name of Gunn effect.

The mechanisms involved in the Gunn effect in GaAs crystals, to which a sufficiently strong electric field is applied, have been studied in numerous laboratories. In general, it has been found that up to field intensities of about 1500 V/cm on bodies of a length of about 0.1 cm the conductivity of the body does not exhibit deviations, whereas at higher field intensities, upwards of a given limit value of the applied voltage, a zone of locally higher resistivity than in the further portion of the body appears and passes through the crystal with a speed which corresponds substantially with the speed of the carrier in the substantially uniform field in the body beyond the movable zone of high resistivity. With bodies of a length less than 0.1 on the minimum value of the field required to produce this effect is higher.

The presence of this zone of very high resistivity involves a very strong potential gradient and consequently a very strong field in said zone and a reduction of the electric field in the body parts beyond the zone of high field intensity.

With the Gunn effect the generation of the zone of very high resistivity is attributed to the transition of electrons from the lower boundary of the conduction band towards the secondary minima of the same band.

Although the Gunn effect is one of the best known mechanisms as a result of which zones of high resistivity may appear in a semiconductor body, this is not the only one: in certain particular cases it has been possible to assess the presence and displacement of regions of high resistivity as a result of a piezo-electric interaction of the electrons passing through a homogeneous semiconductor body and the lattice vibrations of the semiconductor concerned.

Such a phenomenon appears, for example, in a gallium arsenide crystal cut in the 110 direction and used at the ambient temperature or at 77° K, as well as in cadmium sulphide, gallium antimonide or tellurium at room temperature.

The conditions of appearance of the zone of high resistivity and the speed of propagation of the zone are different for the mechanisms concerned; whereas the threshold value for the appearance of the Gunn effect is of the order of 1500 V/cm, the same for the appearance of the piezo-electric effect is of the order of 300 V/cm at a temperature of 77° K. With the Gunn effect the speed of travel of the region of high resistivity is about $10^7$ cms/sec, whereas with the piezoelectric effect this speed corresponds to the speed of propagation of a shear wave in the crystal, in this case, for example, of the order of $3.5 \times 10^5$ cms/sec in GaAs.

It should be noted that the presence of a zone of strong absorption due to a very steep potential gradient in a semiconductor crystal produces a surface having reflecting properties relating to the strong absorption in the crystal.

In a semiconductor crystal of appropriate material, dimensions and orientation the presence of a zone of a particularly steep potential gradient, passing through the crystal in a repetitive or non-repetitive manner, enables the modulation of a beam of radiation.

A device for modulating a beam of electro-magnetic radiation, comprising a semiconductor crystal having contacts, means for applying an electric field across the crystal between the contacts and means for directing a beam of radiation to the crystal, is characterized in accordance with the invention, in that in the crystal the application of an electric field is capable of producing a movable zone travelling from one contact to the other and having a resistivity and a potential gradient exceeding the same values in another of the crystal, said zone having different optical properties for the radiation to be employed than the other parts of the crystal. The direction of the beam of radiation with respect to the displacement of said zone may be chosen differently, for example, transverse of the direction of propagation or in said direction.

The invention will now be described more fully with reference to a few embodiments shown in the accompanying drawing.

Figure 1:
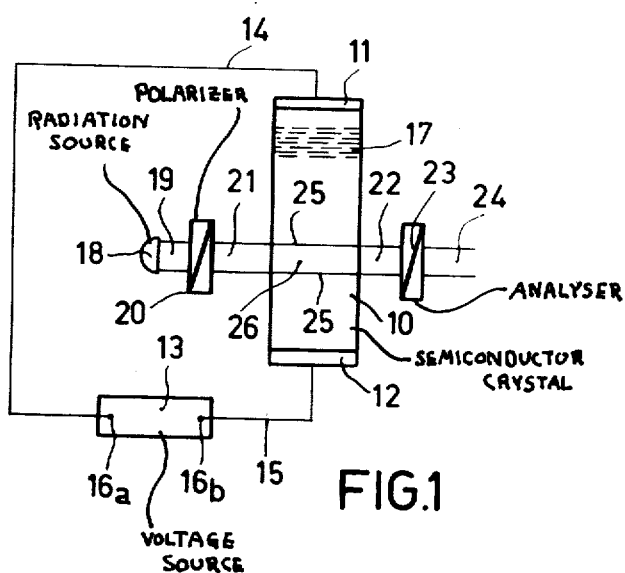
FIG. 1 shows a device according to the invention for the modulation of a polarised beam of radiation and, after certain simplification, also for the modulation of a non-polarised beam.

The semiconductor crystal 10 of FIG. 1 may be an n-type GaAs crystal of high resistivity. At both ends this crystal is provided with contacts 11 and 12 respectively. With an n-type GaAs crystal these contacts may be obtained in known manner, for example, by the deposition of tin, so that ohmic contacts are obtained.

The contacts 11 and 12 are connected through conductors 14 and 15 respectively to a voltage source 13, formed by an electric generator. Part of the electric energy of this generator is converted into heat energy inside the crystal, so that, if this heat cannot be conducted away rapidly, it is advisable to use a voltage pulse generator. Otherwise a direct voltage generator may be employed.

If it is assumed that the contacts 11 and 12 are connected to the negative terminal 16a and the positive terminal 16b respectively of the generator 13 and if the voltage of the generator exceeds a given threshold value a zone 17 of high resistivity appears in the vicinity of the contact 11, in which zone the field intensity is particularly high, said zone travelling towards the contact 12.

A source of radiation 18 emits a preferably parallel beam 19 of preferably monochromatic radiation, which passes through a polariser 20, for example, an appropriately oriented Nicol-, Glan- or Glase-brook prism and is converted into a linearly polarised beam 21, which passes through the crystal 10, which delivers the corresponding beam 22.

The beam 22 strikes an analyser 23, which provides a modulated emerging beam 24.

The path of the beam 21 in the crystal is transverse of the direction of propagation of the zone 17 and is indicated by the lines 25. When the zone 17 of high potential gradient enters the zone 26, indicated by the lines 25, an absorption and a rotation of the polarisation plane of the beam 21 are produced simultaneously. The affected portion of the beam 21 first increases during passage of the zone 17 and then decreases and is finally passed unchanged.

If between two passages of the zone 17 through the zone 26 the polariser 20 and the analyser 23 are adjusted so that with a given intensity of the beam 19 the intensity of the beam 24 is at a maximum, said phenomena of the absorption due to the Franz-Keldysh effect and of rotation of the polarisation plane due to the electric double refraction co-operate for modulating the beam 24.

The emerging beam 24 is thus modulated with the frequency of the passages of the zone 17 through the zone indicated by the lines 25. The modulation percentage, that is to say, the reduction of the intensity of the beam of radiation 24 due to the passage of the beam 21 through the crystal, is, moreover, dependent upon the width of the zone 17 and the intensity of the high electric field in said zone (Franz-Keldysh effect and electric double refraction). The part of the voltage of generator 13 which exceeds the threshold value at which the effect producing the zone 17 appears, is on a first approximation proportional to the product of the width of the zone 17 and the steep potential gradient therein.

By varying the level of the voltage of generator 13, the modulation percentage of the emerging beam 24 can be varied.

As stated above, the threshold value for the piezo-electric effect involving the appearance of the zone 17 corresponds to a field of about 300 V/cm, whereas the threshold value for the Gunn effect corresponds to a field of about 1500 V/cm.

Apparently the possibilities of modulation frequency are dependent upon the speed of propagation of the zone 17, which is about $3.5 \times 10^5$ cms/sec with the piezo-electric effect and about $10^7$ cms/sec with the Gunn effect.

With the piezo-electric effect a crystal 10, for example, of GaAs is cut in the 110 direction and brought at 77° K (the boiling temperature of liquid nitrogen). According to the wavelength of the radiation to be modulated, other semiconductor bodies having an analogous band configuration may be employed, for example, GaAs, CdTe and GaSb. Whichever of the aforesaid effects is utilised, it is important to use a crystal of highest resistivity still appropriate for the phenomenon concerned for limiting heat dissipation due to the voltage pulses or the direct voltage of the generator 13 in the crystal 10.

The device shown in FIG. 1 may be employed for the modulation of a preferably parallel beam of non-polarised radiation solely by using the absorption of the beam (Franz-Keldysh effect), when the zone 17 passes through the zone 26; for this purpose only the polariser 20 and the analyser 23 need be omitted. The resultant modulation percentage is then, the other conditions being the same, lower than that obtained by the combination of the beam absorption and the rotation of the polarisation plane of a linearly polarised beam. The device shown in FIG. 1 may furthermore be employed for the modulation of a beam of linearly polarised radiation, the wavelength of which exceeds the threshold value of wavelength by an amount such that the shift of the threshold due to the Franz-Keldysh effect does not exert a marked influence: the modulation due to the rotation of the polarisation plane is maintained, but the resultant modulation percentage is, of course, lower than that in the case in which the two effects contribute to the modulation.

Figure 2:
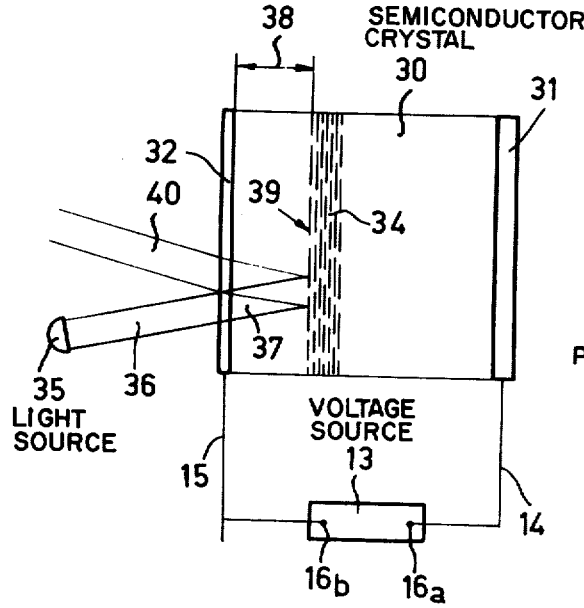
FIG. 2 shows a variant of the device according to the invention for the modulation of non-polarised radiation.

The device shown in FIG. 2 comprises a semiconductor crystal 30, one face of which has an ohmic contact 31 and the other face has an ohmic contact 32, which is permeable to the radiation concerned. The method of applying transparent, conductive layers, for example of tin oxide, for example, to the glass of the bulbs of electron tubes, or to semiconductor devices such as barrier-layer cells is well known. The ohmic contacts 31 and 32 are connected to the negative terminal 16a and the positive terminal 16b respectively of the generator 13 through the conductors 14 and 15 respectively.

When the voltage pulses or the voltage from the generator 13 exceed the threshold where one of the affects starts producing a zone 34 of high resistivity and high field intensity, said zone appears in the proximity of the contact 31 and moves towards the contact 32. A source 35 of visible or non-visible radiation emits a beam 36, which is preferably monochromatic and passes through the transparent ohmic contact 32 and continues its path in the form of the refracted beam 37, which passes through a variable thickness 38 of the semiconductor crystal 30 before it is reflected on the front 39 of the zone 34 of the steep potential gradient. Subsequent to reflection the emerging beam 40 leaves said crystal.

With given constant values of the transmission coefficient of the transparent ohmic contact 32 and of the reflection coefficient of the beam 37 on the front 39 of the zone 34, the modulation of the emerging beam 40 is brought about by the variable absorption due to the variable thickness 38 of the semiconductor 30 prior to and after the reflection of the beam 37 at the front 39.

The modulation percentage depends upon the distance between the contacts 31 and 32, which distance corresponds to the thickness of the semiconductor crystal 30, and the beam 40 may be reduced to a negligible fraction of its maximum intensity, when the zone 34 is in the immediate proximity of the contact 31.

A device of the kind shown in FIG. 2 may be employed for controlling and checking the radiation emission of a laser, if the transparent ohmic contact 32 forms one of the end faces of an interferometer, for example of the Fabry-Perot type, in which the stimulated emission starts when the front 39 reaches the transparent contact 32.

The semiconductor crystal 30 may be a GaAs crystal having the properties indicated for the crystal 10 in FIG. 1 or any of said other semiconductors.

Figure 3:
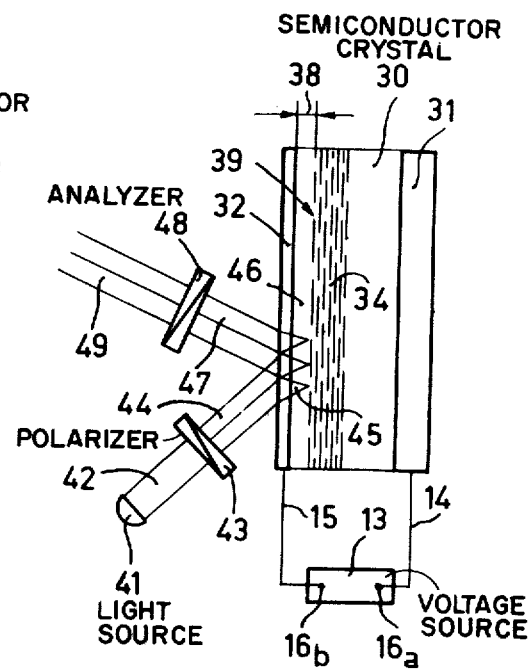
FIG. 3 shows a variant of the device according to the invention for the modulation of polarised radiation.

In the device shown in FIG. 3 the semiconductor crystal 30 is thinner than that of FIG. 2, and the contacts 31 and 32 are connected through conductors 14 and 15 respectively to the terminals 16a and 16b respectively of a generator 13. A monochromatic radiation source 41 supplies a preferably parallel beam 42, which passes through an appropriately orientated polariser 43, for example a Nicol-, Glan- or Glase-brookprism, and is then converted into a linearly polarised beam 44, which passes through the transparent ohmic contact 32 and continues its path through the zone 46 of the crystal 30 in the form of the refracted beam 45. The beam 45 is reflected at the front 39 of the zone 34 of steep potential gradient, obtained as described above and this results in an emerging beam 47, which passes through an analyser 48 and is then converted into a linearly polarised emerging beam 49.

The portion of the crystal 30 lying between the transparent ohmic contact 32 and the front 39 of the zone 34 fulfils the function of the thin layer of variable thickness 38 and gives rise to the known phenomena produced by thin layers with respect to a linearly polarised incident beam of radiation, which beam is converted into an eliptically polarised beam, the orientation of the longer axis of the ellipse being variable so that a reflected beam 47 of the same properties is obtained. The amount of ellipticity varies periodically with the variable thickness of the zone 38, which thickness depends upon the displacement of the zone 34 towards the transparent ohmic contact 32, whilst one period of the variation of the properties of the reflected beam 46 corresponds to a displacement of $\lambda/2$ of the front 39 dependent upon the direction of the beam 45, wherein $\lambda$ is the wavelength of the monochromatic radiation of the source 41. Thus a modulation of the intensity of the beam 47 is obtained, which emerges from the analyser 48; this modulation may be readily obtained with very high frequency: it being assumed that $\lambda/2$ is equal to about 0.7 $\mu$ and the beam 45 is incident at an angle of 45°, $\lambda/2$ for the beam 45 corresponds to a lateral displacement of 0.5 $\mu$ of the front 39 and with a speed of propagation of $10^7$ cms/sec of the zone 34 the resultant modulation frequency is 200 Ghz.

In accordance with the nature and the refractive index of the crystal 30 of semiconductor material the optimum orientation of the vibration plane of the linearly polarised beam 44 may either be that of the plane of incidence or the direction at right angles thereto, or else any of the intermediate directions. It is advantageous for the direction of incidence of the beam 44 to correspond approximately to the Brewster angle of incidence: the analyser 48 is orientated so that the maximum value of the product of the maximum intensity of the beam and the modulation percentage is obtained.

For the device shown in FIG. 3 it is advantageous for the crystal 30 to be very thin, since the modulation of the beam of radiation is based on the behaviour of the zone 46 during the passage of the beam 45, when said zone has the form of a thin layer of variable thickness. This physical effect may furthermore be utilized in a crystal having a greater thickness than is required for the above-mentioned mechanism, so that a modulation of different properties is obtained, which combines:

1. the absorption effect by the reflection with variable depth in the device of FIG. 2, in which the modulation has the repetition frequency of the passages of the zone 34 through the crystal 30:
2. the effect of modulation of very high frequency in the device shown in FIG. 3.

It will be obvious that the invention is not restricted to the embodiments described above and that within the scope of the invention many variants may be designed, inter alia by replacing technical means by equivalent ones. In the case of modulation by absorption for example, the beam of radiation may traverse the crystal in the direction of propagation of the zone instead of passing in a direction transverse thereof, in which case two transparent contacts are used.

What is claimed is:

1. A device for modulating a beam of polarized electro-magnetic radiation, comprising a junction free semiconductor crystal positioned in said beam and having contacts, said crystal comprising a semiconductor body having current-voltage characteristic curve including a region of negative differential resistance, means for applying constant value electric field across the crystal between the contacts, and means for analyzing the polarization of the beam of radiation emerging from the crystal, wherein in the crystal said applied electric field produces an entire high resistance zone travelling through the crystal from one contact to the other, said zone having a resistivity and a potential gradient which are higher than the values in the remaining part of the crystal, said zone having for the radiation concerned different polarization shifting properties than the polarization shifting properties of the remaining part of the crystal.

2. A device as claimed in claim 1 wherein the incident beam of radiation can pass through said zone.

3. A device as claimed in claim 2, wherein the beam of radiation can pass through the zone transversely to the direction of displacement thereof.

4. A device as claimed in claim 1 further comprising means for applying a field intensity of at least 1500 V/cm to the crystal.

5. A device as claimed in claim 1 wherein the crystal comprises gallium arsenide.

6. A device as claimed in claim 1 wherein said electric field intensity is variable.

7. A device for modulating a beam of electro-magnetic radiation, comprising a junction free semiconductor crystal positioned in said beam and having contacts, said crystal comprising a semiconductor body having current-voltage characteristic curve including a region of negative differential resistance, means for applying constant value electric field across the crystal between the contacts wherein in the crystal said applied electric field produces an entire high resistance zone travelling from one contact to the other, said zone having a resistivity and a potential gradient which are higher than the same values in the remaining part of the crystal, said zone reflecting the radiation.

8. A device as claimed in claim 7 wherein at least one of the contacts is permeable to the radiation concerned.

9. A device as claimed in claim 7 wherein the beam of radiation at least partly passes through the crystal in the direction of propagation of the zone.

10. A device as claimed in claim 7 further comprising means for polarizing said beam of electro-magnetic radiation.

11. A device as claimed in claim 7 further comprising means for applying a field intensity of at least 1500 V/cm to the crystal.

12. A device as claimed in claim 7 wherein the crystal comprises gallium arsenide.

13. A device as claimed in claim 7 wherein said electric field is variable.

* * * * *